(12) United States Patent
Blakeman et al.

(10) Patent No.: US 10,752,175 B2
(45) Date of Patent: Aug. 25, 2020

(54) PIVOT MOUNTING ASSEMBLY FOR INTERIOR REARVIEW MIRROR

(71) Applicant: MAGNA MIRRORS OF AMERICA, INC., Holland, MI (US)

(72) Inventors: Rex E. Blakeman, Michigan Center, MI (US); Kevin M. Bentz, Muskegon, MI (US); John C. Hamberg, West Olive, MI (US); Joel B. Wessely, Comstock Park, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 121 days.

(21) Appl. No.: 16/055,194

(22) Filed: Aug. 6, 2018

(65) Prior Publication Data

US 2019/0039519 A1 Feb. 7, 2019

Related U.S. Application Data

(60) Provisional application No. 62/671,458, filed on May 15, 2018, provisional application No. 62/661,500, filed on Apr. 23, 2018, provisional application No. 62/541,905, filed on Aug. 7, 2017.

(51) Int. Cl.
| | | |
|---|---|---|
| *B60R 1/04* | (2006.01) | |
| *F16C 11/06* | (2006.01) | |
| *F16M 11/14* | (2006.01) | |
| *F16M 11/20* | (2006.01) | |
| *B60R 11/00* | (2006.01) | |

(52) U.S. Cl.
CPC ................ *B60R 1/04* (2013.01); *F16C 11/06* (2013.01); *F16C 11/0604* (2013.01); *F16M 11/14* (2013.01); *F16M 11/2078* (2013.01); *B60R 2011/0033* (2013.01); *F16C 2326/01* (2013.01)

(58) Field of Classification Search
CPC ......... B60R 1/04; F16C 11/06; F16C 11/0604
USPC .......................... 359/604, 872, 900; 248/481
See application file for complete search history.

(56) References Cited

U.S. PATENT DOCUMENTS

| | | |
|---|---|---|
| 4,435,042 A | 3/1984 | Wood et al. |
| 4,436,371 A | 3/1984 | Wood et al. |
| 4,826,289 A | 5/1989 | Vandenbrink et al. |
| 4,936,533 A | 6/1990 | Adams et al. |
| 4,948,242 A | 8/1990 | Desmond et al. |
| 5,100,095 A | 3/1992 | Haan et al. |
| 5,327,288 A | 7/1994 | Wellington et al. |

(Continued)

*Primary Examiner* — Ricky D Shafer
(74) *Attorney, Agent, or Firm* — Honigman LLP

(57) ABSTRACT

An interior rearview mirror assembly for a vehicle includes a mounting structure configured to attach at an interior portion of the vehicle and a mirror head pivotally mounted at the mounting structure. The mirror head includes a mirror reflective element and a ball stud that pivotally mounts the mirror head at a socket element of the mounting structure. The ball stud is a metallic element having a base portion and a neck region that extends from the base portion, with a ball member at an end of the neck region distal from the base portion. The ball stud includes a passageway formed at least through the base portion and the neck region. A mounting portion is molded at least partially around the base portion to attach the ball stud at the mirror head. The passageway of the ball stud is at least partially filled with a polymeric material.

20 Claims, 8 Drawing Sheets

(56) References Cited

U.S. PATENT DOCUMENTS

| | | | |
|---|---|---|---|
| 5,377,949 A * | 1/1995 | Haan | B60R 1/04 248/483 |
| 5,487,522 A * | 1/1996 | Hook | B60R 1/04 248/549 |
| 5,820,097 A | 10/1998 | Spooner | |
| 6,068,380 A * | 5/2000 | Lynn | B60R 1/04 359/871 |
| 6,087,953 A | 7/2000 | DeLine et al. | |
| 6,124,886 A | 9/2000 | DeLine et al. | |
| 6,172,613 B1 | 1/2001 | DeLine et al. | |
| 6,243,003 B1 | 6/2001 | DeLine et al. | |
| 6,250,148 B1 | 6/2001 | Lynam | |
| 6,278,377 B1 | 8/2001 | DeLine et al. | |
| 6,318,870 B1 | 11/2001 | Spooner et al. | |
| 6,326,613 B1 | 12/2001 | Heslin et al. | |
| 6,329,925 B1 | 12/2001 | Skiver et al. | |
| 6,341,523 B2 | 1/2002 | Lynam | |
| 6,420,975 B1 | 7/2002 | DeLine et al. | |
| 6,428,172 B1 | 8/2002 | Hutzel et al. | |
| 6,445,287 B1 | 9/2002 | Schofield et al. | |
| 6,483,438 B2 | 11/2002 | DeLine et al. | |
| 6,501,387 B2 | 12/2002 | Skiver et al. | |
| 6,540,193 B1 * | 4/2003 | DeLine | B60R 1/04 248/481 |
| 6,593,565 B2 | 7/2003 | Heslin et al. | |
| 6,598,980 B2 | 7/2003 | Marusawa et al. | |
| 6,690,268 B2 | 2/2004 | Schofield et al. | |
| 6,774,356 B2 | 8/2004 | Heslin et al. | |
| 6,824,281 B2 | 11/2004 | Schofield et al. | |
| 6,877,709 B2 | 4/2005 | March et al. | |
| 6,968,736 B2 | 11/2005 | Lynam | |
| 7,004,593 B2 | 2/2006 | Weller et al. | |
| 7,249,860 B2 | 7/2007 | Kulas et al. | |
| 7,255,451 B2 | 8/2007 | McCabe et al. | |
| 7,262,406 B2 | 8/2007 | Heslin et al. | |
| 7,265,342 B2 | 9/2007 | Heslin et al. | |
| 7,274,501 B2 | 9/2007 | McCabe et al. | |
| 7,289,037 B2 | 10/2007 | Uken et al. | |
| 7,338,177 B2 | 3/2008 | Lynam | |
| 7,360,932 B2 | 4/2008 | Uken et al. | |
| 7,420,159 B2 | 9/2008 | Heslin et al. | |
| 7,420,756 B2 | 9/2008 | Lynam | |
| 7,480,149 B2 | 1/2009 | DeWard et al. | |
| 7,538,316 B2 | 5/2009 | Heslin et al. | |
| 7,855,755 B2 | 12/2010 | Weller et al. | |
| 7,946,505 B2 | 5/2011 | Lynam et al. | |
| 8,049,640 B2 | 11/2011 | Uken et al. | |
| 8,256,821 B2 | 9/2012 | Lawlor et al. | |
| 8,277,059 B2 | 10/2012 | McCabe et al. | |
| 8,451,332 B2 | 5/2013 | Rawlings | |
| 8,508,831 B2 | 8/2013 | De Wind et al. | |
| 8,529,108 B2 | 9/2013 | Uken et al. | |
| 8,534,887 B2 | 9/2013 | DeLine et al. | |
| 8,730,553 B2 | 5/2014 | De Wind et al. | |
| 8,743,203 B2 | 6/2014 | Karner et al. | |
| 8,851,690 B2 | 10/2014 | Uken et al. | |
| 8,944,655 B2 | 2/2015 | Verrat-Debailleul et al. | |
| 9,150,165 B1 | 10/2015 | Fortin et al. | |
| 9,156,403 B2 | 10/2015 | Rawlings et al. | |
| 9,346,403 B2 | 5/2016 | Uken et al. | |
| 9,352,691 B2 | 5/2016 | Watson | |
| 9,352,692 B2 | 5/2016 | Uken et al. | |
| 9,596,387 B2 | 3/2017 | Achenbach et al. | |
| 9,598,016 B2 | 3/2017 | Blank et al. | |
| 10,000,156 B2 | 6/2018 | Koetje | |
| 2002/0088916 A1 * | 7/2002 | March | B60R 1/04 248/549 |
| 2006/0050018 A1 | 3/2006 | Hutzel et al. | |
| 2006/0061008 A1 * | 3/2006 | Karner | B29C 45/0017 264/250 |
| 2009/0295181 A1 | 12/2009 | Lawlor et al. | |
| 2010/0085653 A1 * | 4/2010 | Uken | B60R 1/04 359/872 |
| 2010/0277821 A1 * | 11/2010 | Roth | B60R 1/04 359/872 |
| 2011/0096427 A1 | 4/2011 | Uken et al. | |
| 2013/0112836 A1 | 5/2013 | Rawlings | |
| 2014/0097320 A1 | 4/2014 | Rizk et al. | |
| 2014/0133043 A1 * | 5/2014 | Watson | G02B 7/182 359/872 |
| 2014/0226012 A1 | 8/2014 | Achenbach | |
| 2014/0313339 A1 | 10/2014 | Diessner | |
| 2014/0313563 A1 | 10/2014 | Uken et al. | |
| 2014/0340510 A1 | 11/2014 | Ihlenburg et al. | |
| 2015/0015713 A1 | 1/2015 | Wang et al. | |
| 2015/0097955 A1 | 4/2015 | De Wind et al. | |
| 2015/0251605 A1 | 9/2015 | Uken et al. | |
| 2016/0355135 A1 * | 12/2016 | Koetje | B60R 1/04 |
| 2018/0086269 A1 * | 3/2018 | Uken | B29C 45/1704 |
| 2019/0118713 A1 * | 4/2019 | Steffes | B60R 1/04 |

* cited by examiner

After ECE 46 testing 45° impact

After Article 44 testing

US 10,752,175 B2

PIVOT MOUNTING ASSEMBLY FOR INTERIOR REARVIEW MIRROR

CROSS REFERENCE TO RELATED APPLICATIONS

The present application claims the filing benefits of U.S. provisional application Ser. No. 62/671,458, filed May 15, 2018, U.S. provisional application Ser. No. 62/661,500, filed Apr. 23, 2018, and U.S. provisional application Ser. No. 62/541,905, filed Aug. 7, 2017, which are all hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element.

SUMMARY OF THE INVENTION

The present invention provides an interior rearview mirror assembly that utilizes a metallic ball stud or pivot element that is hollow so that the ball stud utilizes less metal (e.g., zinc) in the die cast process. The mirror mounting portion or toggle element is overmolded at the base of the ball stud and the plastic molding material is molded into the hollowed portion or passageway of the ball stud, such that, if the metallic ball stud breaks, the molded plastic in the cavity of the ball stud will retain the ball member at the mounting portion or toggle element, such that the ball stud and mirror assembly will pass ECE 46 testing and Article 44 testing.

These and other objects, advantages, purposes and features of the present invention will become apparent upon review of the following specification in conjunction with the drawings.

DESCRIPTION OF THE PREFERRED EMBODIMENTS

Figure 1:
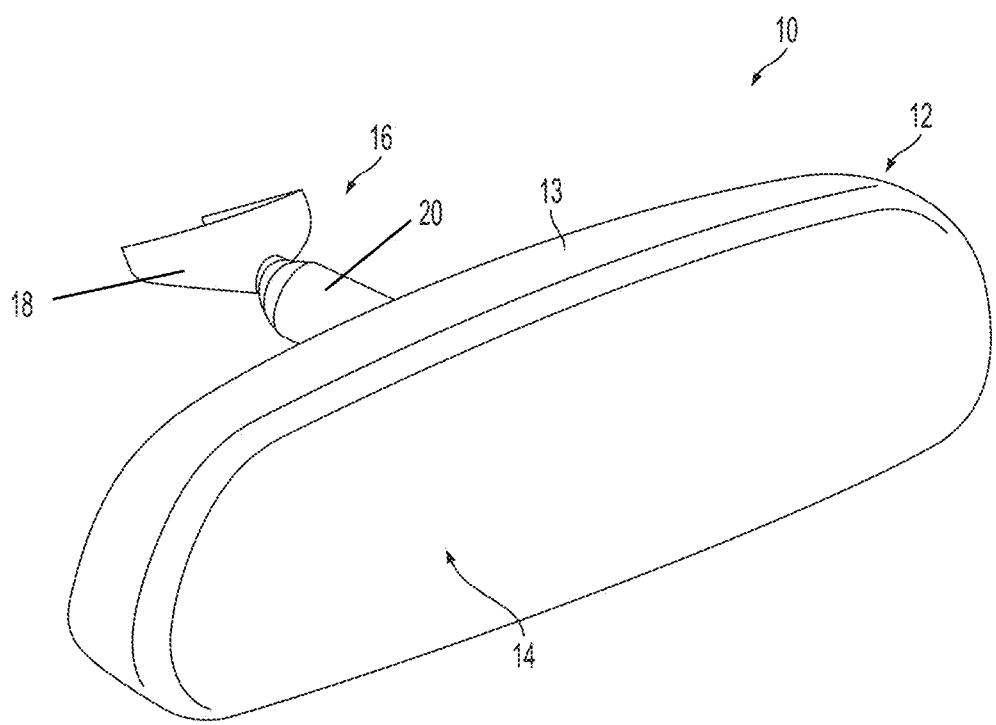
FIG. 1 is a perspective view of an interior rearview mirror assembly in accordance with the present invention.

Referring now to the drawings and the illustrative embodiments depicted therein, an interior rearview mirror assembly 10 for a vehicle includes a mirror head 12 comprising a mirror casing 13 and a reflective element 14 positioned at a front portion of the casing 13 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element may comprise a prismatic mirror reflective element or a variable reflectance mirror reflective element that varies its reflectance responsive to electrical current applied to conductive coatings or layers of the reflective element.

The mounting base includes an attaching portion that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly.

The mirror head includes a metallic ball portion that pivotally mounts at a mounting arm via a ball and socket pivot joint. The socket or pivot element or mounting arm is configured to receive the ball portion of the mirror head and the ball member of the base portion, such as for a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

Figure 2:
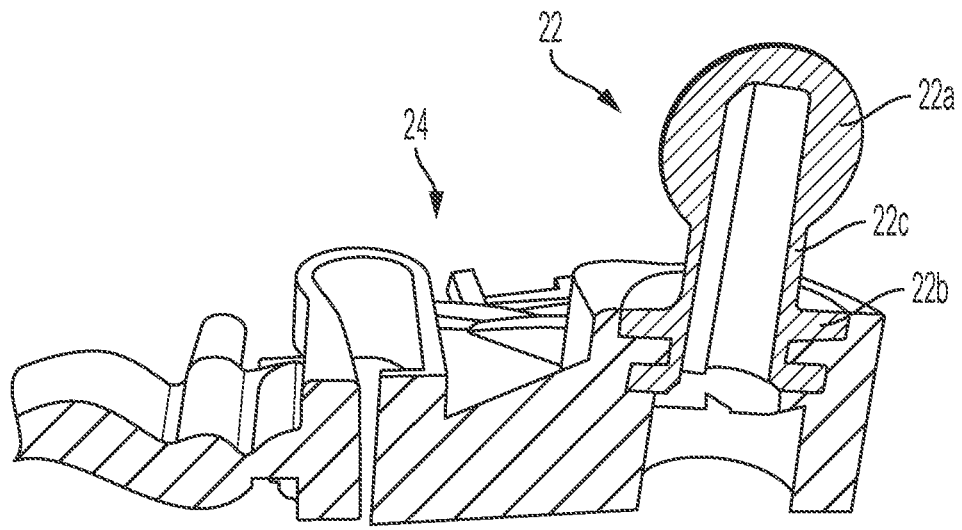
FIG. 2 is a sectional view of a toggle and ball member for an interior rearview mirror assembly.
Figure 3:
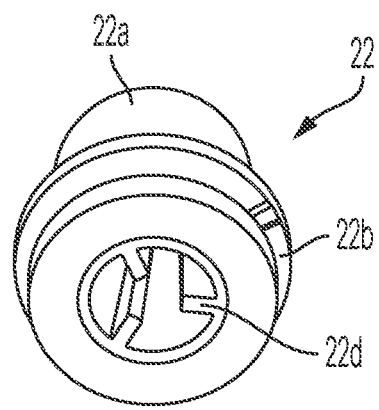
FIG. 3 is a perspective view of a hollow ball member with internal ribs in accordance with the present invention.
Figure 4:
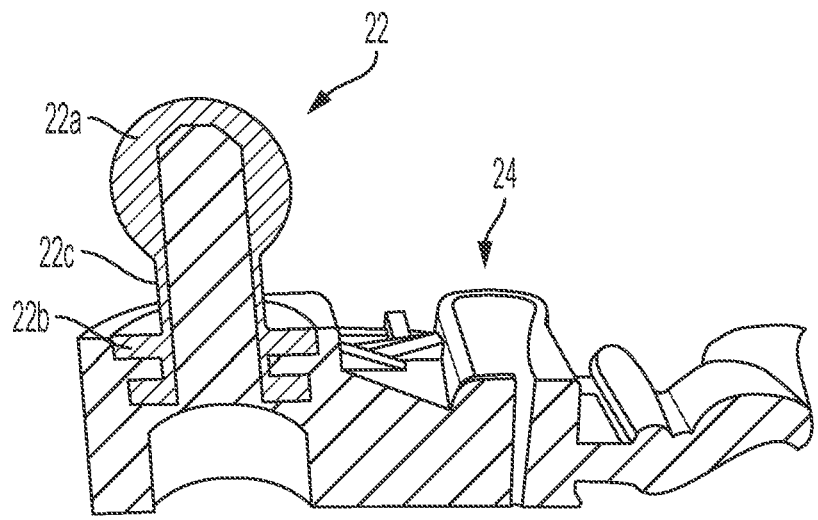
FIG. 4 is a sectional view of a toggle and ball member for the interior rearview mirror assembly of the present invention, shown with the plastic molded into the hollow ball member.

In the illustrated embodiment, the mounting assembly 16 includes a mounting base 18 that is configured to attach at an interior portion of a vehicle, such as to an in-cabin surface of the vehicle windshield, and a mounting arm 20 that is pivotally mounted at the mounting base 18, such as via a first pivot joint or ball and socket configuration. The mirror head 13 is pivotally mounted at the mounting arm 20 via a ball stud 22 that is pivotally received at the end of the mounting arm 20 to establish a second pivot joint or ball and socket configuration. As shown in FIGS. 2-4, the ball stud 22 comprises a metallic element that is formed of a metallic material. For example, the ball stud may be die cast and may comprise zinc.

The ball stud 22 is insert molded at a mounting structure that mounts the ball stud at the rear of the mirror reflective element. In the illustrated embodiment, the ball stud 22 is insert molded at a toggle element 24 that is actuatable by a user to pivot the prismatic mirror reflective element between a daytime viewing position and a nighttime or reduced reflectivity position. The prismatic mirror assembly may be mounted or attached at an interior portion of a vehicle (such as at an interior surface of a vehicle windshield) via the mounting means described herein, and the reflective element may be toggled or flipped or adjusted between its daytime reflectivity position and its nighttime reflectivity position via any suitable toggle means, such as by utilizing aspects of the mirror assemblies described in U.S. Pat. Nos. 7,420,756; 7,338,177; 7,289,037; 7,274,501; 7,255,451; 7,249,860; 6,318,870; 6,598,980; 5,327,288; 4,948,242; 4,826,289; 4,436,371 and/or 4,435,042, and/or U.S. Publication No. US-2010-0085653, which are hereby incorporated herein by reference in their entireties.

Figure 9A:
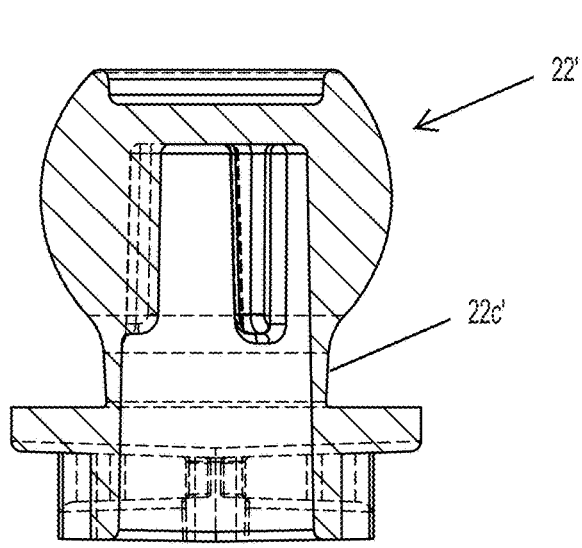
FIG. 9A is a sectional view taken along the line A-A in FIG. 9.
Figure 9:
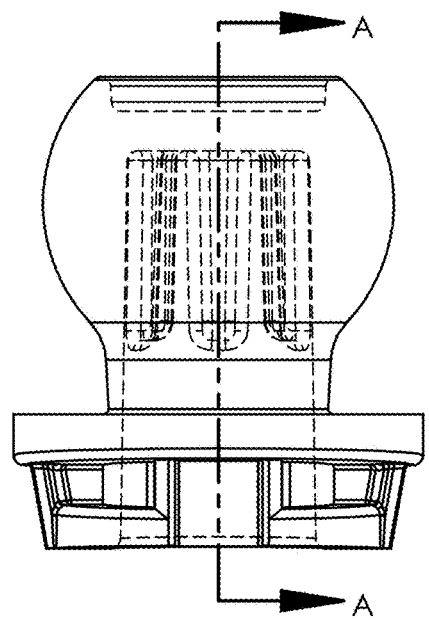
FIG. 9 is a side elevation of the ball member of FIG. 8.
Figure 8:
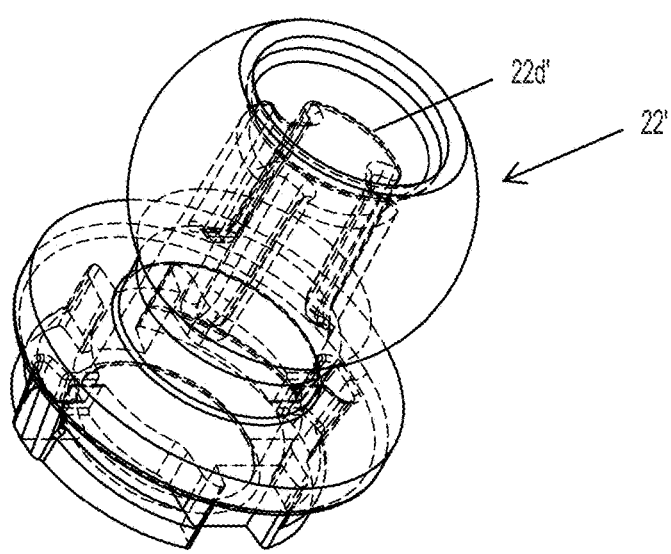
FIG. 8 is a perspective view of another hollow ball member with internal structure.
Figure 10:
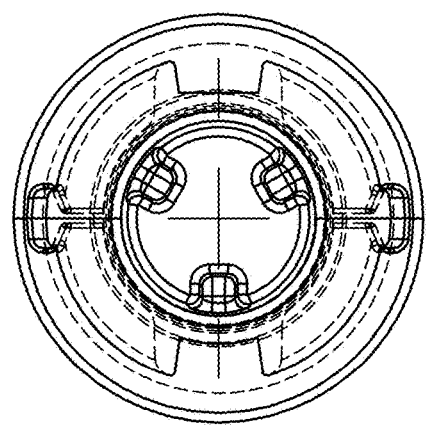
FIG. 10 is an end view of the ball member of FIG. 9.

The ball stud 22 that is insert molded at the toggle element 24 comprises a ball element or member 22a and a base portion 22b that is insert molded at the toggle element 24. The ball stud comprises a hollow element having a passageway established therethrough and with thin side walls at a neck region 22c that extends between the base portion 22b and the ball member 22a. As shown in FIG. 3, a plurality of ribs 22d may be established along the passageway. Optionally, and such as shown in FIGS. 8-10, the ball stud 22' may include internal structure 22d' in the form of three (or more or less) flanges and/or grooves that, when filled with the filler material, provide structure to which the filler material may adhere to retain the polymeric or non-metallic or non-brittle filler material (when cured) in the ball stud, even if the narrowed neck 22c' fractures.

Figure 12:
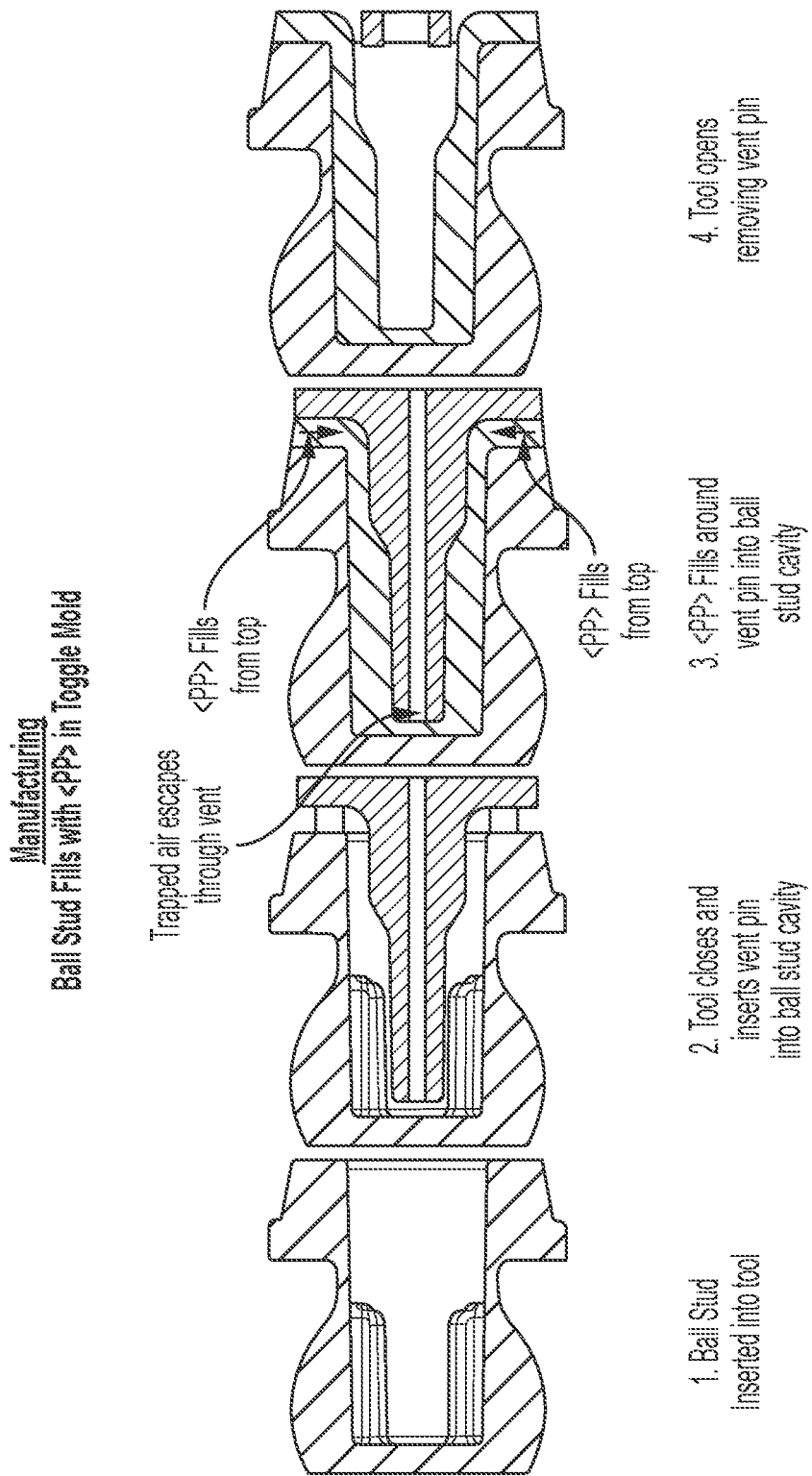
FIG. 12 shows the steps of filling the ball stud during the toggle molding process.
Figure 13:
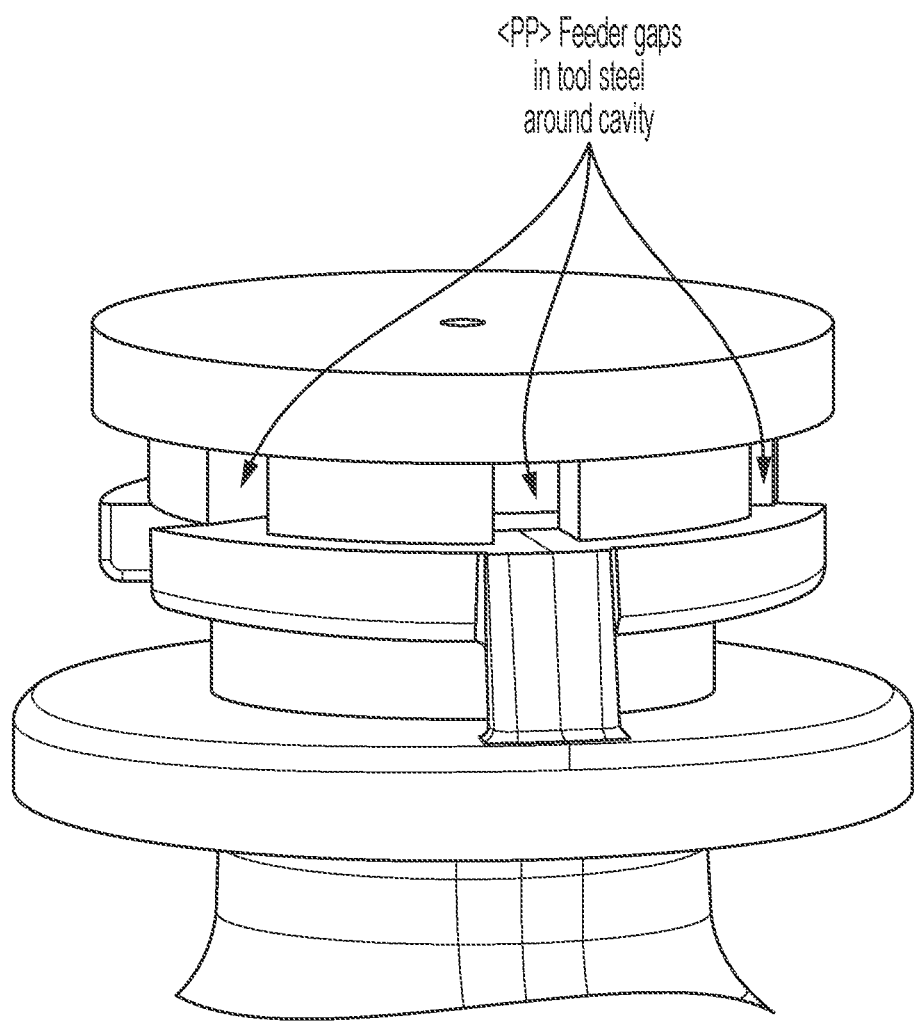
FIG. 13 is a perspective view of the ball stud and mold tool and vent pin used in filling the ball stud.

During the insert molding process that forms or molds the toggle element at least partially over and around the base portion 22b, the plastic molding material is received in the passageway and fills the hollow ball stud. The plastic fills the core of the ball stud and provides enhanced strength, particularly at the thin-walled neck region 22c, which allows the ball stud to be made with thinner walls and thus with less material (e.g., zinc) than conventional ball studs, thus reducing the weight and cost of the ball stud without adversely affecting the ability of the ball stud to pass impact testing. During the molding process, the ball stud with the ribbed core holds back a spring loaded shut off pin, and this allows the core of the ball stud to be filled with plastic while the mounting element is being injection molded of the plastic or polymeric material. As shown in FIGS. 12 and 13, the ball stud may be filled with a polypropylene material or the like via a tool that uses a vent pin to vent trapped air during the filling/molding process. The material fills the ball stud cavity around the vent tube and then may be further filled (with the same or different material) as or after the vent tube is retracted.

The ball stud may be formed by die casting, using a core pin around which the base portion, neck region and ball member are formed. The design of the core pin includes slots (such as EDM or electrical discharge machined slots) on three sections (or more or less sections) of the pin, such that the slots form zinc ribs at the inner surface of the ball stud when the ball stud is formed around the pin. The ball stud of the present invention is formed using a larger diameter core pin with the ribbed ball design, such that the walls of the neck region of the ball stud are purposely thinner to reduce zinc usage and to break easier, allowing the plastic to hold the mirror together during and after testing using the ribbed surface to hold onto the inside of the ball stud.

Optionally, the ball stud may be filled with a tethering material that may be different from the material that molds the mounting element. For some applications, such as the smaller 15 mm ball studs, injection molding limitations such as air venting, may not allow the ball stud cavity to fill in a controlled manner. In such applications, the ball stud cavity may be filled (or pre-filled) prior to over-molding to form the toggle assembly.

This fill process of the ball stud presents the ball stud cavity opening (ball feature down) to nozzles that inject polymer material to fill the cavity (the internal cavity areas at each of parts 22a, 22b, 22c). When the injected polymer material is cured, the material provides the intended tether function if the ball stud neck is fractured, such as in a similar manner as is done during the ECE 46 impact test. Once the ball stud core is filled, the filled ball stud can then be used in the injection overmold process to form the toggle assembly.

This fill process thus may be separate from the toggle molding, and can use a variety of fill materials to provide the tether function. One part liquid adhesives and polymers, two part liquid adhesives and polymers, hot melt adhesives and/or polymers, as well as a dedicated injection molding process, may be used to provide the tether fill material to the cored opening of the ball stud. For example, the ball stud may be filled with a hot melt material or adhesive or with a silicone material or adhesive or the like that may be filled or injected into the cavity via a needle nozzle or other suitable mechanism. Such materials allow for flexibility of the cured tether material upon breakage of the ball stud neck region to further absorb the impact.

Figure 5A:
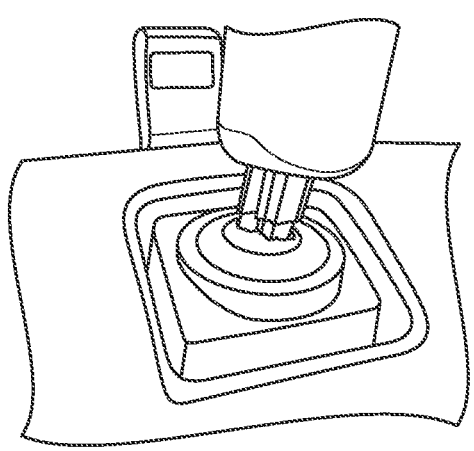
FIGS. 5A and 5B are photos showing fractures after ECE 46 testing and Article 44 testing, respectively.
Figure 5B:
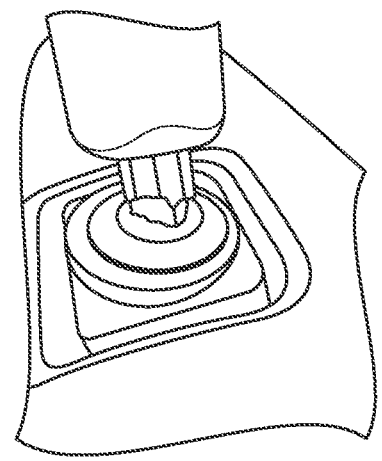
Figure 6A:
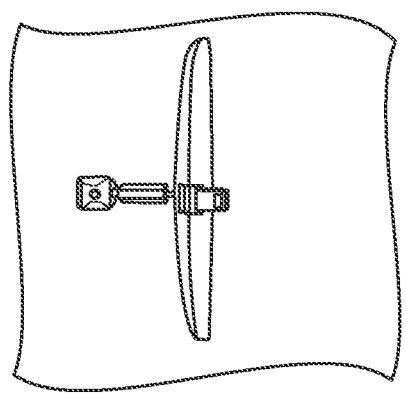
FIGS. 6A and 6B are photos showing the mirror head, ball stud and mounting arm arrangements at a non-pivoted position and a maximum travel position, respectively, during impact testing.
Figure 6B:
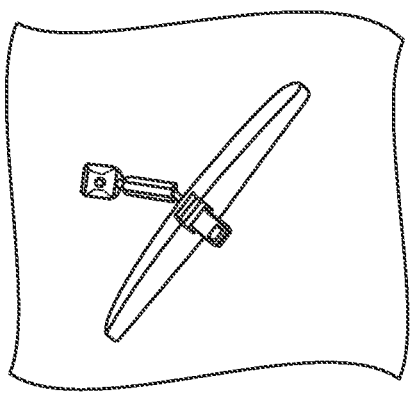
Figure 7A:
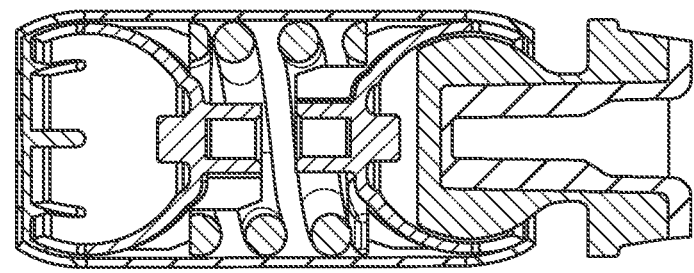
FIGS. 7A and 7B are schematics showing the ball stud and mounting arm arrangements at a non-pivoted position and a maximum travel position, respectively.
Figure 7B:
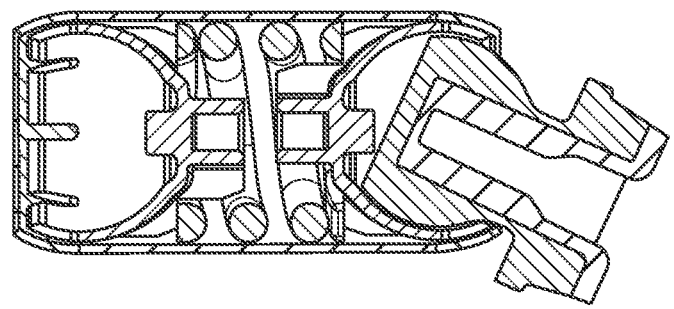

During impact testing, the thinner wall (such as a wall having a thickness of less than 1.5 mm, such as around 0.6 mm to 0.9 mm, such as, for example, 0.7 mm or 0.8 mm or thereabouts) allows the zinc to break, and the ribbed sections hold onto the plastic, thus holding both sides of the mirror assembly (the mounting arm and ball member and the base portion and toggle element) together to pass the ECE 46 and Article 44 impact testing (see FIGS. 5A and 5B). As shown in FIGS. 6A, 6B, 7A, 7B, the ball stud pivotally mounts the mounting arm thereat, and allows for pivoting of the mounting arm about the ball. When the mounting arm pivots the maximum amount (FIGS. 6B and 7B), the end of the mounting arm tube or sleeve contacts the neck of the ball stud, and the ball stud neck is designed to break and absorb the impact energy, whereby the filler material acts as a tether to retain the ball at the base of the ball stud.

Adding ribs to the ball stud gives the plastic a surface to capture enough friction to hold both parts of the mirror together through and after the impact testing. Without the ribs to interface with the plastic, the plastic may come out of the ball stud's head section or ball member during testing, causing failures. The plastic is malleable allowing it move during the impact testing without having the plastic break. The plastic or polymeric material may comprise any suitable material, such as an injection molded robust plastic or such as a silicone or a urethane or the like. Optionally, the filler material may comprise a two part urethane material, such as, for example, a urethane material provided by Epic Resins of Palmyra, Wis. and commercially sold as S7302-02, or preferably S7302-07. These are tough materials that cure to a very tough, firm rubber-like material that has excellent adhesion to metals and withstands automotive environmental durability testing very well.

Figure 11:
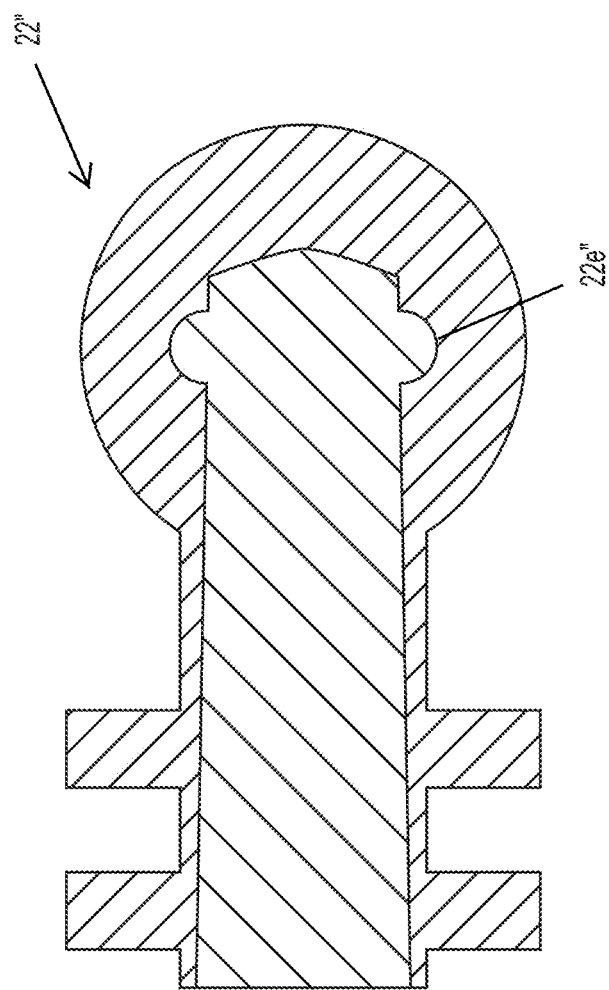
FIG. 11 is a sectional view of another hollow ball member with internal structure to enhance retention of a molded inner core.

Optionally, the ball member may be formed with a secondary machining step to create an undercut inside the cored cavity in the ball area. For example, the ball member 22" (FIG. 11) have an undercut 22e" near the inner end of the cored cavity where additional polymeric material flows during the molding of the core element. This undercut is something that the core cannot create with conventional die-casting. The undercut provides a significant locking of the polymeric core portion in the core cavity, and is particularly useful for materials, such as thermal plastic materials (e.g., polypropylene), that do not have "adhesion" to the die-casting. Thermal plastics almost exclusively rely on mechanical locking and this technique greatly increases the resistance for the polymer to pull out of the ball area during and after breaking of the neck region of the die-cast ball member. The draft of the stay locks one end of the polymer plug and the undercut or recess or circumferential groove in the neck (around the central core) in the ball head locks the ball end of the polymer plug. This makes it very difficult for the two broken die cast pieces (such as after impact of an object with the mirror assembly) to separate fully, since they are effectively tethered together by the polymer plug.

The ball member of the present invention thus has improved energy absorbing features that allow the ball member and mirror mount to break in a controlled manner. The hollowed zinc ball is formed with a thinner-walled neck region so that the neck region is the weak link of the metallic ball member, with a polymeric core portion molded in the cored ball member to hold the metal pieces together when/if the metallic neck region of the ball member breaks. The polymeric material is molded or injected in the cored region(s) of the ball member in an uncured state, and when cured, holds the ball member together when the zinc or metal breaks or fractures. The polymer may comprise any suitable material, such as thermoplastic polymers or polypropylenes or silicones or urethanes or the like. The polymeric material is preferably a tough, pliable or ductile material that allows for elongation and/or flexing without breaking. The filler material may provide adhesion to the metallic ball member and/or the ball member may include structure in its core to enhance retention of the filler material therein.

The back plate or mounting portion or toggle element may comprise any suitable construction. Optionally, the ball member is insert molded at the base and at the rear of the back plate during the injection molding process that forms the back plate, such as by utilizing aspects of the mirror assemblies described in U.S. Pat. Nos. 7,855,755; 7,249,860 and 6,329,925 and/or U.S. Pat. Pub. No. US-2006-0061008, which are hereby incorporated herein by reference in their entireties).

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, and/or U.S. Des. Pat. Nos. D633,423; D633,019; D638,761 and/or D647,017, which are hereby incorporated herein by reference in their entireties (and with electrochromic and prismatic mirrors of such construction are commercially available from the assignee of this application under the trade name INFINITY™ mirror).

Optionally, the mirror assembly may comprise an electro-optic or electrochromic mirror assembly that includes an electro-optic or electrochromic reflective element. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, which are all hereby incorporated herein by reference in their entireties.

A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior rearview mirror assembly for a vehicle, said interior rearview mirror assembly comprising:

a mounting structure configured to attach at an interior portion of a vehicle;

a mirror head pivotally mounted at said mounting structure;

wherein said mirror head comprises a mirror reflective element;

wherein said mirror head comprises a ball stud having a ball member that pivotally mounts said mirror head at a socket element of said mounting structure;

wherein said ball stud comprises a metallic element having a base portion and a neck region that extends from said base portion, with said ball member at an end of said neck region distal from said base portion;

wherein said ball stud comprises a passageway formed at least through said base portion and said neck region;

wherein said mirror head comprises a mounting portion that is molded at least partially around said base portion of said ball stud to attach said ball stud at said mirror head; and wherein said passageway of said ball stud is at least partially filled with a polymeric material.

2. The interior rearview mirror assembly of claim 1, wherein said mirror reflective element comprises a prismatic mirror reflective element, and wherein said mounting portion comprises a toggle element that is actuatable to pivot said prismatic mirror reflective element between a daytime viewing position and a nighttime or reduced reflectivity position.

3. The interior rearview mirror assembly of claim 1, wherein said ball stud comprises a plurality of ribs protruding radially inward into and along said passageway, and wherein the polymeric material at least partially fills in gaps between the ribs.

4. The interior rearview mirror assembly of claim 1, wherein said mounting portion is injection molded at least partially around said base portion and into said passageway, and wherein the polymeric material that at least partially fills said passageway of said ball stud comprises the molded material of said mounting portion.

5. The interior rearview mirror assembly of claim 1, wherein said passageway of said ball stud is at least partially filled with the polymeric material as a separate process from molding said mounting portion at least partially around said base portion of said ball stud.

6. The interior rearview mirror assembly of claim 1, wherein said mounting structure comprises a base configured to attach at the interior portion of the vehicle and a mounting arm pivotally mounted at said base, and wherein the socket element is disposed at an end of said mounting arm distal from said base.

7. The interior rearview mirror assembly of claim 1, wherein said neck region of said ball stud comprises a reduced wall thickness to allow for breakage of said ball stud upon impact at said mirror head, and wherein, when said neck region of said ball stud breaks, the polymeric material within said passageway of said ball stud retains said ball member at said base portion and said mounting portion.

8. The interior rearview mirror assembly of claim 7, wherein the polymeric material comprises a material that, when cured, is flexible to accommodate movement of said ball member relative to said base portion when said neck region of said ball stud breaks.

9. An interior rearview mirror assembly for a vehicle, said interior rearview mirror assembly comprising:
a mounting structure configured to attach at an interior portion of a vehicle;
a mirror head pivotally mounted at said mounting structure;
wherein said mirror head comprises a mirror reflective element;
wherein said mirror reflective element comprises a prismatic mirror reflective element, and wherein said mirror head comprises a toggle element that is actuatable to pivot said prismatic mirror reflective element between a daytime viewing position and a nighttime or reduced reflectivity position;
wherein said mirror head comprises a ball stud having a ball member that pivotally mounts said mirror head at a socket element of said mounting structure;
wherein said ball stud comprises a metallic element having a base portion and a neck region that extends from said base portion, with said ball member at an end of said neck region distal from said base portion;
wherein said ball stud comprises a passageway formed at least through said base portion and said neck region;
wherein said toggle element is molded at least partially around said base portion of said ball stud to attach said ball stud at said mirror head;
wherein said passageway of said ball stud is at least partially filled with a polymeric material;
wherein said neck region of said ball stud comprises a reduced wall thickness to allow for breakage of said ball stud upon impact at said mirror head; and
wherein, when said neck region of said ball stud breaks, the polymeric material within said passageway of said ball stud retains said ball member at said base portion and said toggle element.

10. The interior rearview mirror assembly of claim 9, wherein said ball stud comprises a plurality of ribs protruding radially inward into and along said passageway, and wherein the polymeric material at least partially fills in gaps between the ribs.

11. The interior rearview mirror assembly of claim 9, wherein said toggle element is injection molded at least partially around said base portion and into said passageway, and wherein the polymeric material that at least partially fills said passageway of said ball stud comprises the molded material of said toggle element.

12. The interior rearview mirror assembly of claim 9, wherein said passageway of said ball stud is at least partially filled with the polymeric material as a separate process from molding said toggle element at least partially around said base portion of said ball stud.

13. The interior rearview mirror assembly of claim 9, wherein said mounting structure comprises a base configured to attach at the interior portion of the vehicle and a mounting arm pivotally mounted at said base, and wherein the socket element is disposed at an end of said mounting arm distal from said base.

14. A method for manufacturing a vehicular interior rearview mirror assembly, said method comprising:
providing a mounting structure configured to attach at an interior portion of a vehicle;
providing a mirror head, wherein the mirror head comprises a mirror reflective element;
providing a ball stud, wherein the ball stud comprises a metallic element having a base portion and a neck region that extends from the base portion, with a ball member at an end of the neck region distal from the base portion, and wherein the ball stud comprises a passageway formed at least through the base portion and the neck region;
molding a mounting portion at least partially around the base portion of the ball stud;
at least partially filling the passageway of the ball stud with a polymeric material;
mounting the mounting portion at the mirror head to attach the ball stud at the mirror head; and
pivotally mounting the mirror head at the mounting structure via the ball member received in a socket element of the mounting structure.

15. The method of claim 14, wherein the mirror reflective element comprises a prismatic mirror reflective element, and wherein the molding a mounting portion comprises molding a toggle element that is actuatable to pivot the prismatic mirror reflective element between a daytime viewing position and a nighttime or reduced reflectivity position.

16. The method of claim 14, wherein the providing a ball stud comprises providing a ball stud having a plurality of ribs protruding radially inward into and along the passageway, and wherein the at least partially filling the passageway of the ball stud comprises filling gaps between the ribs with the polymeric material.

17. The method of claim 14, wherein the molding a mounting portion comprises injection molding the mounting portion at least partially around the base portion and into the passageway, and wherein the polymeric material that at least partially fills the passageway of the ball stud comprises the injection molded material of the mounting portion.

18. The method of claim 14, wherein the at least partially filling the passageway of the ball stud comprising at least partially filling the passageway with the polymeric material as a separate process from molding the mounting portion at least partially around the base portion of the ball stud.

19. The method of claim 14, wherein the neck region of the ball stud comprises a reduced wall thickness to allow for breakage of the ball stud upon impact at the mirror head, and wherein, when the ball stud breaks, the polymeric material within the passageway of the ball stud retains the ball member at the base portion and the mounting portion.

20. The method of claim 19, wherein the polymeric material comprises a material that, when cured, is flexible to accommodate movement of said ball member relative to said base portion when said neck region of said ball stud breaks.

\* \* \* \* \*